(12) United States Patent
Gamay

(10) Patent No.: US 8,974,849 B2
(45) Date of Patent: Mar. 10, 2015

(54) CONCENTRATED SHELF STABLE LIQUID COFFEE

(71) Applicant: Aly Gamay, McClean, VA (US)

(72) Inventor: Aly Gamay, McClean, VA (US)

( * ) Notice: Subject to any disclaimer, the term of this patent is extended or adjusted under 35 U.S.C. 154(b) by 68 days.

(21) Appl. No.: 13/651,251

(22) Filed: Oct. 12, 2012

(65) Prior Publication Data

US 2014/0106055 A1    Apr. 17, 2014

Related U.S. Application Data

(60) Provisional application No. 61/546,975, filed on Oct. 13, 2011.

(51) Int. Cl.
*A23F 5/36* (2006.01)
*A23F 5/24* (2006.01)
*A23F 5/28* (2006.01)
*A23F 5/46* (2006.01)

(52) U.S. Cl.
CPC . *A23F 5/46* (2013.01); *A23F 5/243* (2013.01); *A23F 5/28* (2013.01)
USPC ............ 426/594; 426/519; 426/520; 426/392

(58) Field of Classification Search
CPC ............. A23F 5/00; A23F 5/08; A23F 5/243; A23F 5/28; A23F 5/285; A23L 2/385
USPC ................... 426/594, 519, 520, 392
See application file for complete search history.

(56) References Cited

U.S. PATENT DOCUMENTS

| | | | | |
|---|---|---|---|---|
| 3,652,292 | A * | 3/1972 | Bach et al. ..................... | 426/594 |
| 8,043,645 | B2 * | 10/2011 | Robinson et al. ............. | 426/432 |
| 8,114,458 | B2 * | 2/2012 | Robinson et al. ............. | 426/595 |
| 8,114,459 | B2 * | 2/2012 | Robinson et al. ............. | 426/595 |
| 8,414,953 | B2 * | 4/2013 | Robinson et al. ............. | 426/594 |
| 8,524,306 | B2 * | 9/2013 | Robinson et al. ............. | 426/594 |
| 8,535,748 | B2 * | 9/2013 | Robinson et al. ............. | 426/594 |
| 8,541,042 | B2 * | 9/2013 | Robinson et al. ............. | 426/594 |
| 2005/0103200 | A1 * | 5/2005 | Huik .............................. | 99/279 |

\* cited by examiner

*Primary Examiner* — Anthony Weier
(74) *Attorney, Agent, or Firm* — Bio Intellectual Property Services LLC (Bio IPS); O. (Sam) Zaghmout

(57) ABSTRACT

The present invention is directed to a technique of producing an ultra-concentrated liquid coffee that is shelf-stable at ambient temperature without the need for refrigeration or freezing. This invention further relates to a process for manufacturing ultra-concentrated stabilized liquid coffee with enhanced freshness, aroma and flavor retention without acidity or bitterness.

8 Claims, No Drawings

CONCENTRATED SHELF STABLE LIQUID COFFEE

CROSS-REFERENCE TO RELATED APPLICATIONS

This application claims the benefit of U.S. Provisional Application No. 61/546,975, filed Oct. 13, 2011. The entire disclosure of this prior application is hereby incorporated by reference.

FIELD OF INVENTION

The present invention is generally related to the field of coffee, and more particularly to the making of an ultra-concentrated shelf-stable liquid coffee. More specifically, the present invention is directed to a technique of stabilizing an ultra-concentrated liquid coffee to make it shelf-stable at room temperature without the need for refrigeration or freezing. This invention further relates to a process for manufacturing acidified ultra-concentrated stabilized liquid coffee with enhanced aroma and flavor retention without acidity or bitterness. The liquid beverage concentrate is also resistant to microbial growth without the need for additional preservatives, thereby enabling storage at ambient temperatures.

BACKGROUND OF THE INVENTION

The brewing of coffee using only coffee beans and water is an art practiced through the world. While many different coffee beans, roasting and grinding techniques, bean/water ratios may be used based on regional and cultural preferences, the basic hot extraction method remains similar. Therein, the bean in desired form is exposed at an elevated temperature for a period of time sufficient to extract the desired constituents for the taste of the end consumer. Against such background, it is widely accepted that excessive brewing temperature can adversely affect the palatability of the resulting brew. Similarly, insufficient brewing temperature results in insufficient extraction and an undesirably weak brew. Further, it is widely accepted that reheating a properly brewed coffee to excessive temperatures can also adversely affect the desired taste. Accordingly, notwithstanding advances in automatic equipment available to the consumer, brewing a highly palatable coffee remains an elusive challenge.

Recently, in addition to regularly brewed coffee, specialized coffee drinks have become popular. Mocha, espresso, cafe latte, cappuccino and the like require brewing techniques not readily and reliably practiced in the consumer setting, and accordingly are available primarily only at commercial settings having specialized equipment and personnel for such products. Also, cold coffees are becoming popular and require a non-bitter coffee concentrate that will maintain desired flavor in the presence of dilution with ice and additives.

In an effort to provide the consumer and the commercial establishment with a wide variety of hot and cold coffee based beverages that can be reliably and repetitively served without specialized equipment, an effort has been made to provide coffee concentrates that can be heated, diluted, cooled, processed and formulated for such applications. However, the basic constituents of coffee have prevented acceptably shelf-stable products from being successfully developed. Coffees, unlike many food and beverage concentrates, deteriorate in unacceptable ways due to enzymatic and bacterial degradation. While such reactions can be retarded through refrigeration, such storage is expensive and effective for limited time periods and compromised unless completely utilized at first consumption, inasmuch as the temperature transients in handling outside the refrigerated setting can accelerate and resume the undesired reactions. Such limitations also reduce the availability and increase the cost of such products to the consumer inasmuch as refrigerated shelf space is expensive in storage or retail facilities. Further, conventional processing and packing techniques have not provided a satisfactory solution. Coffee is an exceedingly complex liquid of aromatics, oils and other flavor and texture enhancing entities contributing to the recognized taste criteria of acidity, body, aroma, flavor and essence. These qualities by presence or absence determine quality and acceptability of the brewed coffee to the consumer.

Consumers demand convenience and quality in newly introduced coffee innovations. There are a number of schemes for providing devices for making a single beverage server, such as a cup of coffee or tea. In one approach a disposable container fits on top of a cup and has a compartment for receiving a beverage extract such as coffee with a large reservoir on top into which a person must pour boiling water. U.S. Pat. No. 5,325,765 describes a beverage filter cartridge that includes an impermeable pierceable base having a predetermined shape and an opening at one end; a self-supporting wettable filter element disposed in the base sealingly engages with the opening in the base and has a form different and smaller than the predetermined shape of the base so that the filter element diverges from the base and divides the base into two sealed chambers, a first chamber for storing an extract of the beverage to be made, and a second empty chamber for accessing the beverage after the beverage outflow from the filter has been made by combining a liquid with the extract; and an impermeable pierceable cover sealingly engaged with the opening in the base to form an impermeable cartridge. That disposable container proved to be very popular due to delivering a quality cup of coffee in a convenient manner. However, the cost of the disposable container is high preventing many frugal consumers from using this technology.

One of the innovated approaches in the liquid coffee industry is to freeze the coffee concentrates during or prior to shipping and storage. When needed, the frozen liquid coffee concentrates are left at room temperature for a few days or as needed to thaw out and then should be used within two weeks otherwise deterioration in quality is noticed. Such an approach is expensive and requires freezing capability prior to and during shipping and handling. It also reduces the duration during which the concentrate is suitable for consumption and unused portions often have to be discarded.

Aseptic thermal processing of coffee concentrates is one of the approaches used to stabilize coffee concentrates. U.S. Pat. No. 6,399,136 describes a shelf stable coffee concentrate for extended periods at ambient temperatures includes an aseptically packaged coffee concentrate. Thermal processing of liquid coffee concentrates reduce desirable coffee aroma and develop off notes in the finished beverage drink.

U.S. Pat. No. 6,054,162 is directed to a liquid coffee in which the development of acidity has been inhibited and which results in a longer shelf-stable product. The method used in making the liquid coffee product of the present invention includes treating the coffee extract with an alkali, the alkali being present in an amount effective to convert acid precursors present in the coffee extract to their respective acid salts, and thereafter neutralizing the treated coffee extract with an acid, the acid being present in an amount effective to neutralize any excess alkali from the first step and to adjust the final pH of the liquid coffee product to the desired value.

Factors that determine the quality of liquid coffee and liquid coffee concentrates may be its acidity and/or level of sulfur containing compounds. The effect acids, acidity, and sulfur levels have on the organoleptic characteristics of a cup of coffee can, in many cases, be determining factors in the consumer appeal of a coffee beverage. For example, too much acidity in a coffee can result in an undesirable sourness to the beverage, while too little acidity in the coffee may cause a flat flavor profile. Maintaining a stable acidity and flavor profile of a coffee beverage can, therefore, be important in producing and maintaining a coffee beverage that is desired by consumers unless new methods are developed to mask the impact of various acidity levels on organoleptic characteristics.

The task of maintaining the optimal acidity of a coffee beverage is not easy because it is believed that over 25 different acids exist naturally in roasted coffee and that many different factors can affect the final acidity of coffee. For instance, coffee may include chlorogenic, malic, citric, acetic, formic, glycolic, lactic and pyroglutamic acids as well as others. In addition, different bean varieties may also affect beverage acidity. For example, the pH of a coffee brewed from *Arabica* varieties generally has a pH between about 4.85 and about 5.15. Coffee brewed with *Robusta* beans, on the other hand, generally has a higher pH in the range of about 5.25 to about 5.40. Other processing factors can also affect the degree of acidity, such as, the degree of roast, the roast profile, the nature of the processing and the age of the green beans and the like.

Due to the length of commercial supply chains and the desired shelf life of liquid coffee, a shortcoming exists with liquid coffee concentrates. Liquid coffee concentrates and extracts tend to be an unstable system, and both shelf- and refrigerator-stored liquid coffee products tend to naturally develop an increased acidity and varying flavor profile over a period of time generally due to naturally occurring acid-generating reactions in the beverage. Over time, these acid-generating reactions can slowly change the beverage's pH throughout a product's shelf file so that the beverage's acidity may also slowly change from the day it is produced to later in its shelf life. A rise in acidity or sourness of the beverage (lowering of pH) may translate into an inconsistent product and a loss of quality unless innovative methods are created to mask the impact of acid on taste.

The coffee concentrate manufactures attempt to control acid development in their concentrates and to prevent pH drift down to pH lower than approximately 4.7 to 5.5. One attempted solution to prevent the sourness development in liquid coffee beverages over time is the addition of sodium bicarbonate to elevate the initial pH of the product. However, the pH of the sodium bicarbonate-treated liquid coffee product still falls over time as the naturally occurring acid generating reactions occur, which still results in a varying acidity profile throughout the product's shelf life. U.S. Pat. No. 6,054,162 describes another attempted solution to address the problem of liquid coffee sourness development. The '162 patent describes a method that inhibits the development of acidity by treating a coffee extract with an excessively large amount of alkali relative to the coffee solids to drive a reaction that converts any acid precursors in the beverage to their respective salts to inhibit the generation of acid. However, such method undesirably increases the pH of the coffee to unacceptably high levels with the excessive amounts of alkali (which is needed to drive the desired reactions) and, therefore, also requires neutralization of the treated coffee with an acid to neutralize the excess alkali into respective salts in order to adjust the final pH to the desired value.

US patent application publication no. US 2010/0316784 A1 describes a method for stabilizing liquid coffee concentrates is by blending a liquid coffee concentrate base with an edible alkali source in an amount effective to artificially increase a pH of the liquid coffee concentrate base between about 0.5 to about 1.5 pH units to form a pH increased coffee concentrate. Next, an aromatic and/or coffee flavor is optionally added to the pH increased coffee concentrate. The pH increased coffee concentrate, with or without the flavor additive, is then aseptically processed and thermally treated at about 285 to about 295° F. for about 60 to about 180 seconds to artificially drive acid generating reactions in the concentrate to completion to form a stabilized liquid coffee concentrate.

In general, the processors of liquid coffee concentrates exert every effort to assure the pH of the concentrate remains higher than 4.6 and even if the pH is dropped to below 4.6, it is usually brought up before consumption to pH higher than 4.6, otherwise undesirable sour notes are detected in hot coffee beverages. For instance, U.S. Pat. No. 6,406,730 relates to a process and apparatus for producing low acid food products by which a naturally low acid food product can be acidified for storage and later de-acidified at the point of dispensing for consumption or freezing in suitable equipment.

The phrase "acidified foods" means low-acid foods to which acid(s) or acid food(s) are added and which have a water activity greater than 0.85 and have a finished equilibrium pH of 4.6 or below. Acidified food may be thermally processed, or processed with permitted preservatives to destroy vegetative cells of microorganisms of public health significance and to inhibit the reproduction of microorganisms of non-health significance.

The Code of Federal Regulations ("CFR") governs many, if not most, aspects of food processing. Specifically, the CFR sets forth distinctions between "low-acid" foods and so called "acidified" foods. According to 21 CFR §114.3, the phrase "low-acid foods" means any foods, other than alcoholic beverages, with a finished equilibrium pH greater than 4.6 and a water activity greater than 0.85. Low acid foods include milk, ice cream, creamers, and milk and/or vegetable fat containing beverages such as flavored cappuccino beverages. Special processing, packaging and handling of these products are necessary to prevent premature spoilage and the growth of microorganisms of public health significance. Current processing standards for unrefrigerated low acid foods require the application of a "minimum thermal process" with the application of heat to food, either before or after sealing in a hermetically sealed container, for a period of time and at a temperature scientifically determined to be adequate to ensure destruction of microorganisms of public health significance.

In the world of coffee, it is generally found that pleasing flavor and aroma are particularly desirable characteristics in coffee products. Such characteristics are commonly associated with freshly brewed, high quality coffee. If a coffee product lacks a pleasing flavor and aroma, it is often perceived by the consumer to be of lesser quality. Soluble, or instant, coffee has unfortunately developed a reputation in the coffee industry, and among some consumers, as being a less desirable choice in coffee beverages because it lacks the flavor and aroma of high quality, freshly brewed coffee.

Thus, for many years, producers of soluble coffee have sought to reduce or eliminate the perceived differences between soluble coffee and freshly brewed coffee. Not surprisingly, the majority of this effort has focused on flavor and aroma improvement. Soluble coffee is commonly prepared by spray drying or freeze drying a hot water extract of a roasted coffee. This preparation process often results in a soluble coffee product which is lacking in some of the desired flavors and aromas typically associated with high quality, freshly brewed coffees. Alternately, the soluble coffee may have additional flavors and aromas considered undesirable, such as "instant" flavors or aromas. Unfortunately, this often results in the aforementioned negative perception of soluble coffee by consumers.

Many attempts to remedy this problem have been made, the most common being the incorporation of oils containing aroma constituents into the soluble coffee. The process of adding aromas to soluble coffee is known as aromatization. Aromatization generally involves capturing an aroma in a substrate, such as an oil or emulsion. See, for example, U.S. Pat. No. 5,222,364. Usually coffee oil or an emulsion of coffee oil and coffee extract is used as the substrate. The aroma-containing substrate may then be sprayed on, or injected into, the soluble coffee powder prior to the coffee being packaged in containers and sealed. The theory of aromatization is that adding aromas to soluble coffee via oils provides a soluble product which more closely mimics the aroma of fresh roast and ground coffee.

While aromatization is effective for improving the aroma of soluble coffee to some extent, it is not without its difficulties. With the substrates generally used to carry out aromatization, it is often found that either the incorporation of the aroma and/or substrate is too good, or not good enough. If the incorporation of the aroma is too good, the aroma is effectively trapped within the substrate and not sufficiently released. Thus, the consumer is unable to experience the benefit of improved aroma in the soluble coffee product when it is prepared. In an attempt to remedy this problem, recent developments suggest that aroma-enriched microemulsions of coffee oil may be used to improve the aroma of soluble coffee. See U.S. Pat. No. 5,576,044. Such microemulsions add aroma to the soluble coffee without the use of surfactants and stabilizers. However, the process of collecting the aromas and then adding them to the soluble coffee is costly when compared to manufacturing conventional soluble coffee without added aroma oils. This increased cost in the manufacturing process must then be absorbed by the consumer at the point of purchase.

Additionally, the addition of aroma oils does nothing to remedy the deficient perceived flavor of the soluble coffee. It merely improves the perception of aroma when a new container of instant coffee is first opened. On the other hand, if the incorporation of the aroma is not good enough, the aromas will volatilize before, or soon after, incorporation into the product and again, the desired benefit will be lost. Additionally, if the incorporation of the aroma-enriched oil into the soluble coffee is not good enough, and the oils are not properly blended with the soluble coffee, there is a tendency for an unpleasant oil slick to form on the top of the product.

Thusly, a well established need continues to exist for a packaged concentrated coffee product having extended storage life at ambient temperatures that retains full flavor without diminution over time and may be added to hot or cold water to produce various coffee formats.

SUMMARY

The present invention is directed to a technique of producing an ultra-concentrated liquid coffee that is shelf-stable at ambient temperature without the need for refrigeration or freezing. This invention further relates to a process for manufacturing ultra-concentrated stabilized liquid coffee with enhanced freshness, aroma and flavor retention without acidity or bitterness.

The processing of the liquid concentrates may not involve any thermal treatment or pasteurization in order to preserve the integrity of flavor and aroma and allow using a reduced serving size. The selection of coffee component is described in order to produce ultra concentrated liquid. Food grade acids are added to affect pH at about 4.6 to 5.2 to make the liquid beverage concentrate resistant to microbial growth without the need for additional preservatives, thereby enabling storage at ambient temperatures. Utilizing the natural anti-microbial properties at pH about 5.1 or below proved to be sufficient to inhibit the proliferation of pathogens, bacteria, mold and yeast. Further incorporation of coffee oil and homogenization ensures sufficient distribution of coffee oil droplets in the liquid as well as mask any acid or sour note that may exist. Microground coffee (particle size of about 300 microns or less) may also be incorporated in the liquid concentrate to enhance aroma, taste and freshness.

The ultra-concentrated shelf stable liquid coffee concentrate could be packaged in single-serve or multi-serve kits to deliver a about 3 to 7 grams to be utilized per serving of final beverage.

The present invention further relates to composition and method for producing individual dosages or multi-serve packs of ultra-concentrated shelf-stable liquid coffee to be mixed with water to provide flavored coffee beverages.

Accordingly, it is an object of the present invention to provide an extended shelf life concentrated coffee product retaining the flavor characteristics of freshly brewed product.

Another object of the invention is to provide a process for packaging ultra-concentrated shelf-stable liquid coffee for long term storage under non-refrigerated or non-freezing conditions without a loss of desirable taste and aroma characteristics or any microbial spoilage.

A further object of the invention is to provide ultra-concentrated shelf-stable liquid coffee to be mixed with water to provide hot or cold beverage without the need of any coffee making or preparing equipment and may be carried out in small packages.

A further object of the invention is produce ultra-concentrated shelf-stable liquid coffee that could be mixed with water to produce cold or hot coffee drinks.

An ideal ultra-concentrated shelf-stable liquid coffee will have to be stable at room temperature and deliver a cup of coffee, cold or hot, that is similar to freshly brewed coffee. A novel process is needed to deliver coffee beverages that avoid of undesirable acidity and bitterness and yet provides the full aroma and flavor of freshly brewed coffee.

Considerable effort, therefore, has been expended in an attempt to address the ultra-concentrated shelf-stable liquid coffee limitations in the production of high quality coffee products, and the extended use of high quality coffees. There remains a need in the art for compositions and methods for improving shelf stable coffee concentrates to be used with coffee that ensures consistent, stable, high product quality that are easily adaptable to a variety of coffee materials, and are economical and easy to use. Accordingly, it is an object of the present invention to provide compositions and methods which address these needs and provide further related advantages.

Other objects, features and advantages of the present invention will be apparent from these summary and description of preferred embodiments, and will be readily apparent to those skilled in the art having knowledge of gelled products/compositions and their methods of preparation. Such objects, features, benefits and advantages will be apparent from the above as taken in conjunction with the accompanying examples, tables, data and all reasonable inferences to be drawn there from.

DEFINITIONS

Unless defined otherwise, all technical and scientific terms used herein have the same meaning as commonly understood by one of ordinary skill in the art to which this invention belongs. Still, certain elements are defined below for the sake of clarity and ease of reference.

"Shelf stable" means a food product that is microbiologically and chemically stable at ambient temperature without refrigeration or freezing.

"Aseptic processing" means the filling of a commercially sterilized product into pre-sterilized containers, followed by aseptic hermetic sealing, with a pre-sterilized closure, in an atmosphere free of microorganisms. Means of aseptic processing include 1) still reports; 2) agitating retorts; 3) hydrostatic retorts; 4) aseptic processing & packaging systems 5) flame sterilizers 6) water activity management & thermal processing 7) other systems.

"Low acid foods" means any foods other than alcoholic beverages, with a finished equilibrium pH greater than 4.6 and a water activity (a) greater than 0.85. Tomatoes and tomato products having a finished equilibrium pH less than 4.7 are not classified as low-acid foods.

"Acid foods" mean foods that have a natural pH of 4.6 or below.

"Acidified food" means low acid foods to which acid(s) or acid food(s) have been added. They have a water activity (a) greater than 0.85 and have a finished equilibrium pH of 4.6 or below. These foods may be called or purport to be, "pickles" or "picked foods". Carbonated beverages are usually not included.

The term "pH" is used to designate the intensity or degree of acidity. The value of pH, the logarithm of the reciprocal of the hydrogen ion concentration in solution, is usually determined by measuring the difference potential between two electrodes immersed in a sample solution.

The term "water activity level" is defined in the book "Food Science", Third Edition, A.V.I. (1984) as a qualitative measure of unbound free water in a system that is available to support biological and chemical reactions. In general, as the water activity of a given food product decreases, its shelf life increases. A high water activity (Aw) product becomes more susceptible to mold, fungus and bacterial proliferation. For instance, the FDA defines a low acid food product with a pH of greater than 4.6 as shelf stable only if it has a water activity of 0.85 or less. Two foods with the same water content can vary significantly in their water activity depending on how much free water is in the system. When a food is in moisture equilibrium with its environment, the water activity of the food will be quantitatively equal to the relative humidity in headspace of the container divided by 100.

As used herein, the term "ultra-concentrate" means high concentration of coffee solids coupled with elevated levels of coffee aroma and flavors. "Ultra-concentrated liquid coffee" refers to a liquid coffee concentrate that is used at a small serving size compared to conventional liquid coffee concentrates.

As used herein, the term "coffee source component" is defined as a blend of coffee sources derived from a plant of the Family Rubiaceae, Genus *Coffea*, from a given region of origin.

There are many coffee species, however, it is generally recognized by those skilled in the art that there are two primary commercial coffee species, *Coffea arabica* and *Coffea canephora* var. *robusta*. Coffees from the Species *arabica* are frequently described as "Brazils," which come from Brazil, or "Other Milds" which are grown in other premium coffee producing countries. Premium *arabica* countries are generally recognized as including Colombia, Guatemala, Sumatra, Indonesia, Costa Rica, Mexico, United States (Hawaii), El Salvador, Peru, Kenya, Ethiopia and Jamaica. Coffees from the Species *canephora* var. These *robusta* coffees are typically grown in the lower regions of West and Central Africa, India, South East Asia, Indonesia, and Brazil.

The coffee source can be in a variety of forms including, but not limited to, liquid concentrates, micro-ground coffee, soluble coffee, spray dried coffee, freeze dried coffee, liquid extracts of coffee via aqueous, super-critical fluid, and organic solvent extraction processes. The coffee source can also be caffeinated, decaffeinated, or a blend of both.

It has been determined according to the present invention that coffee beverages and compositions that exhibit consumer preferred flavor characteristics may be produced from a variety of coffee sources. The preferred coffee source for a particular use may vary according to considerations of availability, expense, and flavor associated with the coffee source. Additionally, the degree and nature of impurities and other components in the coffee source may be considered. A coffee beverage composition may also be produced from a blend of one or more suitable coffee sources.

Coffee sources exist in a variety of forms including, but not limited to, cherries, leaves, bark, soluble coffee, instant coffee, roast and ground, roasted whole bean, green coffee beans, extracts including aqueous, super-critical fluid, and organic solvents, and mixtures thereof. Furthermore, the coffee source can be caffeinated, decaffeinated, or a blend of both. It is recognized that coffee sources suitable for use in the present invention may contain various impurities and/or by-products.

Coffee sources of the present invention are defined by coffee variety (i.e., coffee species and region of origin). By region of origin it is meant a coffee growing region wherein the coffee growing process utilizes genetically similar coffee seedlings. Additionally, a region of origin experiences similar soil conditions, fertilization conditions, growing environment (e.g., rainfall amount, temperature, altitude, sunlight), and pre-roasting process, handling, and storage conditions. The species, region of origin, and coffee growing, harvesting, processing, roasting, fermentation, preparation, grafting, genetic engineering, handling and/or storage process conditions determine the presence and concentration of a given acid in a coffee source.

The coffee sources of the present invention contain one or more of the following acids: Formic, Acetic, Propanoic, Butanoic, Pentanoic, Hexanoic, Heptanoic, Octanoic, Nonanoic, Decanoic, Palmitic, Crotonic, Isocrotonic, Hydroxyacetic, Isobutyric, Lactic, 3-hydroxypropanoic, Glyceric, 2,3-dihydroxypropanoic, 2-(4-methoxyphenoxy) propanoic, 2-hydroxybutyric, 2,4-dihydroxybutyric, 2-methylbutanoic, Isovaleric, Methacrylic, Tiglic, Angelic, 3-methyl-2-butenoic, Pyruvic, 2-Oxobutyric, 3-oxobutanoic, Levulinic, Oxalic, Malonic, Succinic, Glutaric, Fumaric, Maleic, Methylsuccinic, Malic, Tartaric, 2-hydroxyglutaric, Ketoglutaric, Citraconic, Mesaconic, Itaconic, Citric, Aspartic, Glutamic, Pyroglutamic, Nicotinic, 2-Furoic, Benzoic, 3-hydroxybenzoic, 4-hydroxybenzoic, 2,5-dihydroxybenzoic, 3,4-dihydroxybenzoic, 3,4,5-Trihydroxybenzoic, 1,2,4-trihydroxybenzoic, Vanillic, Phytic, Phosphoric, Quinic, Caffeic, Ferulic, 3-(4-Hydroxy-3-methoxyphenyl)-2-propenoic, p-coumaric, o-coumaric, 4-methoxycinnamic, 3,4-dimethoxycinnamic, 3,4,5-trimethoxycinnamic, 3-caffeoylquinic, 4-caffeoylquinic, 5-caffeoylquinic, 3-feruloylquinic, 4-feruloylquinic, 5-feruloylquinic, 3,4-dicaffeoylqunic, 3,5-dicaffeoylqunic, 4,5-dicaffeoylqunic, p-coumaroylquinic, caffeoylferuoylqunic. The exact concentration of a specific acid within a given coffee source depends on the coffee species selected, the growing and harvesting conditions, and the coffee source preparation processes described above.

Coffee sources have been found to contain varying levels of acids depending on their form. For example, green coffee has been found to contain approximately 11% total acid by weight, roasted coffee has been found to contain approximately 6% total acid content by weight, and instant coffee has been found to contain approximately 16% total acid content by weight. Coffee sources with varying acidity and pH may be employed in the current invention as acidifying agents to achieve pH at or below about 4.6.

The coffee sources could be derived from a plant of the Family Rubiaceae, Genus *Coffea*, from a given region of origin. The coffee element of the target coffee can be in a variety of forms including, but not limited to, cherries, beans, leaves, and bark, and mixtures thereof. Additionally, the coffee sources can take the form of soluble coffee, roast and ground, roasted whole bean, green coffee, and extracts of coffee via aqueous, super-critical fluid, and organic solvent extraction processes. The coffee sources may also exist as a mixture of two or more of the aforementioned forms. The coffee element may be caffeinated, decaffeinated, or a blend of both.

As used herein, the term "coffee concentrate" means a liquid coffee extract, or a dried product of the extract, obtained by aqueous extraction of roasted and ground coffee, wherein such extract may require further processing (e.g., dilution) prior to consumption.

As used herein, the term "coffee extract" means a liquid extract of roasted and ground coffee, or a dried product of the extract, obtained during the manufacture of soluble (i.e., instant) coffee. Additionally, the term "coffee extract" refers to an "intermediate" liquid or solid that is subsequently processed and eventually dried to provide soluble (instant) coffee particles.

As used herein, the term "soluble coffee product" means a coffee product comprising soluble, or instant, coffee particles which can be prepared by any process known to those skilled in the art, as well as by the process described herein. In general, soluble coffee is prepared by roasting and grinding a blend of coffee beans, extracting the roasted and ground coffee with water to form an aqueous coffee extract, and drying the extract to form the "soluble coffee product."

As used herein, the term "coffee oil" means the natural product obtained by solvent extraction or physical expression or extraction of the oil from coffee beans.

A "supplemental coffee acid source component" is defined as a compound, or combination of compounds, that adjusts the perceptible acid concentration of one or more coffee source components. In solution, an acid can exist entirely in an associated form, entirely in a dissociated form, or as a combination of the two.

The supplemental coffee acid source component can exist in a variety of forms. The supplemental coffee acid source component may exist in a solution of water, or some other suitable aqueous medium. Moreover, the coffee source component modifier can exist in non-aqueous solutions (e.g., oil and glycerin). Alternatively, coffee source component modifier may exist as one or more dry ingredients.

The supplemental coffee acid source component can be combined with the coffee source in a variety of ways, depending on the nature and form of the coffee source and the coffee source component modifier. If the coffee source selected were a micro-ground coffee, the supplemental coffee acid source component could exist in an aqueous solution that is sprayed onto, or mixed with, the roast and ground coffee. Alternatively, the supplemental coffee acid source component could exist in a dry state, and be mixed with the roast and ground coffee source in a coffee composition. When the coffee composition is transformed into a coffee beverage, the coffee source component modifier would then act to adjust the perceptible concentration of the supplemental coffee acid source component in the method described. The supplemental coffee acid source component can exist in any suitable form in an intermediate state of the final, consumable coffee beverage. The form of the supplemental coffee acid source component is only limited by the need to exist in a state capable of adjusting the perceived concentration of the coffee source component, in the final, consumable form of the coffee beverage.

Supplemental coffee acid source component that are a combination of two or more suitable compounds can be combined with the coffee source together or separately. Additionally, multi-compound supplemental coffee acid source component can exist in different states (e.g., in solution and a dry state) so long as they are capable of adjusting the required pH of the coffee source component, in the final, consumable form of the coffee beverage.

A supplemental coffee acid source component may also be defined as a taste contributing acid. The supplemental coffee acid source component can exist in either the acidic form of the taste contributing acid (e.g., Lactic, Citric Acid; Malic Acid; Formic Acid; Fumaric Acid; Phosphoric Acid; 2-Furoic Acid; Acetic Acid), or as a salt of the taste contributing acid (e.g., Mono-, Di-, or Tri-Sodium Citrate; Mono-, Di-, or Tri-Potassium Citrate; Mono-, or Di-Sodium Malate; Mono- or Di-Potassium Malate; Sodium Formate; Potassium Formate; Mono- or Di-Sodium Fumarate; Mono- or Di-Potassium Fumarate; Mono-, Di-, or Tri-Sodium Phosphate; Mono-, Di-, or Tri-Potassium Phosphate; Sodium Furoate; Potassium Furoate; Sodium Lactate; Potassium Lactate).

Though the supplemental coffee acid source component may be any of the taste contributing acids, preferred taste contributing acids are the acids of the following anions: Quinate, Lactate, Acetate, Formate, 2-Furoate, 3-Methyl Malate, Citramalate, Hydroxyglutarate, Glutarate, Malate, Citraconate, Maleate, Mesaconate, Oxalate, Fumarate, Phosphate and Citrate.

Supplemental coffee acid source component existing in solution could also be applied (e.g., by spraying or mixing) to a roasted whole bean, green coffee bean, liquid coffee extract, soluble coffee, or other form of a coffee source (e.g., cherries, leaves, and the like). The same is true for a supplemental coffee source component existing as a dry ingredient. The supplemental coffee source component can exist in any suitable form, in an intermediate state of the final, consumable coffee beverage. The exact form of the supplemental coffee source component is only limited by the need to exist in a state capable of supplementing the total concentration of the corresponding coffee source component, in the final, consumable form of the coffee beverage.

As used herein the term "flavor and aroma component" means a coffee oil added to soluble coffee, liquid coffee, coffee extracts or coffee concentrates in such a way as to suppress the sour taste and acid perception of acidified coffee, such that the sour taste is less easily or less readily perceived by the consumer. "flavor and aroma component" also means a component that helps mask flavor off notes and enhance overall flavor and aroma of coffee or coffee beverages. Various processes may be used to obtain oil from roast and ground coffee; however, extraction and expression are the most widely used techniques.

As used herein the term "homogenized" is used interchangeably with the term "homogenization" to mean the preparation of an oil-in-water emulsion of the type described herein. The oil droplets have a defined particle size and particle size distribution. An emulsion may be homogenized by any method known to one skilled in the art, such as, for example, subjecting the emulsion to high temperature and/or high pressure and/or multiple pass homogenization and/or high sheer or combinations thereof.

DETAILED DESCRIPTION OF THE INVENTION

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the preferred methods, devices and materials are now described.

All publications mentioned herein are incorporated herein by reference for the purpose of describing and disclosing the subject components of the invention that are described in the publications, which components might be used in connection with the presently described invention.

The information provided below is not admitted to be prior art to the present invention, but is provided solely to assist the understanding of the reader.

The details of one or more embodiments of the invention are set forth in the accompanying drawings and the description below. Other features, objects, and advantages of the invention will be apparent from the description and drawings, and from the claims.

The present invention relates to novel method for producing an ultra-concentrated shelf-stable liquid coffee. More specifically, the present invention is directed to a technique of stabilizing an ultra-concentrated liquid coffee to make it shelf-stable at room temperature without the need for refrigeration or freezing.

This invention further describes a process for manufacturing acidified ultra-concentrated stabilized liquid coffee with enhanced aroma and flavor without perceived acidity or bitterness. The ultra-concentrated liquid beverage concentrate is also resistant to microbial growth without the need for refrigeration, freezing or additional preservatives, thereby enabling storage at ambient temperatures.

In order to prepare liquid stabilized coffee, the standard practice in the industry is to subject the liquids to thermal heat treatments. Sterilization, aseptic packaging or pasteurization alter the flavor characteristics of liquid coffee and produce off-notes. The methods of the prior art to stabilize the liquid coffee concentrates utilize elevated temperatures that are selected to thermally destroy microorganisms, can easily evaporate or destroy flavor compounds in liquid coffee. Upon exposure to excessive temperatures long thermal treatment times acid concentration may increase as well. Coffee concentrates maybe exposed to elevated temperatures between about 285° F. to about 295° F. After heating, concentrates are processed through an aseptic system to a packaging line. The concentrates may be exposed to a single or multistage heating configuration. In one approach, the concentrate is exposed to an aseptic heating coil at temperatures of about 293 to about 295° F. Furthermore, in another approach, the heating may be a first heater of about 179° F.; a second heater of about 285° F. to about 295° F., and a third heating stage of about 293° F. to about 295° F. temperatures above these ranges tend to flash off or destroy the functionality of the flavor and generally tend to degrade the flavor of the coffee. Temperatures below this range are not practical because they require longer processing equipment and longer processing times.

Elevated processing temperatures are also utilized in producing soluble coffee and instant coffee. Flavor defects are produced and coffee products are perceived to be of a lesser quality.

The inventors have discovered that several coffee source components could be blended at room temperature, without using any heating, in order to preserve the aroma and flavor of combined coffee source component especially the microground coffee component.

When coffee components are is blended at ambient temperature, aroma and flavor that are carried by coffee source components, liquid concentrates, coffee extracts, soluble coffee and coffee essences are preserved within the ultra liquid concentrate and released only when the inventive concentrate is added to hot water. When ground coffee (particle size of about 350 microns or less) is incorporated in the liquid concentrate at room temperature, the ground coffee does not release coffee taste or aroma and stay inert until the addition of hot or cold water, for final consumption. That novel approach helps to enhance aroma, reduce acidity perception and increase overall quality of coffee beverages.

By this novel mean, the aroma and flavor are kept protected until the product is finally used by consumers. By preserving the aroma and flavors of coffee source components, the current method is capable of producing ultra-concentrated liquid coffee. Only 5-10 grams of the ultra-concentrated liquid coffee is sufficient to produce a fresh tasting cup of coffee (6 to 8 ounces). That dilution rate correspond to one part of ultra-concentrated liquid coffee added to 25 to 30 parts of water. The current offering of liquid coffee concentrates are used at the rate of 1 part of liquid coffee concentrate to 3 to 20 parts of water, yet producing light tasting coffee.

The current invention allows for adding various coffee components at high concentration of about 40-70% coffee solids, yet delivering flowable and less viscous fluid that is easy to use and disperse. Producing coffee concentrates with high coffee solids (about 40-70%) allow for raising the pH of the concentrate without adversely impacting the microbiological keeping quality and shelf life of the concentrates. Increasing the Brix (measurable concentration of solids) results in lowering the water activity of liquid concentrate and consequently increasing microbial stability.

To the surprise of the inventors, thermal processing of liquid coffee concentrates is not essential to stabilize the ultra-concentrate liquid coffee when it is acidified to a pH of about 4.6 or less. The antimicrobial properties of coffee components couple with low pH produce a shelf-stable ultra-concentrate liquid coffee that does not require freezing or refrigeration during any stage of processing, handling or distributing to the final consumer.

By definition, low acid liquid coffee concentrates and extracts prepared in a conventional manner will have a natural pH of greater than 4.6 (usually about 4.9-5.6). In general, a low-acid food product is acidified to a pH of about 4.6 or less by addition of a suitable acid. The pH is preferably less than 4.6, as this is the range *Clostridium botulimum*, the most dangerous and most heat resistant of the food poisoning bacteria, is inhibited from growth. Preferred ranges for modification of the pH will vary depending upon the particular food item being acidified and the effect upon taste characteristics, but the pH range for most food products will generally fall within the preferred range of from about 3.6 to about 4.6, with a pH of 4.4 to 4.6 particularly preferred.

The acid used for acidification should be selected to be compatible with the natural coffee flavor and preferably does exist in natural coffee at any level. Generally, though, any GRAS (generally regarded as safe) acid will be suitable for acidification. It is preferable to use one of the natural acids that are present in natural coffee beans or derive during roasting or processing. For example, one or more of the following naturally occurring acids or more may be used: Formic, Acetic, Propanoic, Butanoic, Pentanoic, Hexanoic, Heptanoic, Octanoic, Nonanoic, Decanoic, Palmitic, Crotonic, Isocrotonic, Hydroxyacetic, Isobutyric, Lactic, 3-hydroxypropanoic, Glyceric, 2,3-dihydroxypropanoic, 2-(4-methoxyphenoxy)propanoic, 2-hydroxybutyric, 2,4-dihydroxybutyric, 2-methylbutanoic, Isovaleric, Methacrylic, Tiglic, Angelic, 3-methyl-2-butenoic, Pyruvic, 2-Oxobutyric, 3-oxobutanoic, Levulinic, Oxalic, Malonic, Succinic, Glutaric, Fumaric, Maleic, Methylsuccinic, Malic, Tartaric, 2-hydroxyglutaric, Ketoglutaric, Citraconic, Mesaconic, Itaconic, Citric, Aspartic, Glutamic, Pyroglutamic, Nicotinic, 2-Furoic, Benzoic, 3-hydroxybenzoic, 4-hydroxybenzoic, 2,5-dihydroxybenzoic, 3,4-dihydroxybenzoic, 3,4,5-Trihydroxybenzoic, 1,2,4-trihydroxybenzoic, Vanillic, Phytic, Phosphoric, Quinic, Caffeic, Ferulic, 3-(4-Hydroxy-3-methoxyphenyl)-2-propenoic, p-coumaric, o-coumaric, 4-methoxycinnamic, 3,4-dimethoxycinnamic, 3,4,5-trimethoxycinnamic, 3-caffeoylquinic, 4-caffeoylquinic, 5-caffeoylquinic, 3-feruloylquinic, 4-feruloylquinic, 5-feruloylquinic, 3,4-dicaffeoylqunic, 3,5-dicaffeoylqunic, 4,5-dicaffeoylqunic, p-coumaroylquinic, caffeoylferuoylqunic. Furthermore, other acids such as Phosphoric could be employed to acidify the ultra concentrate.

Acetic, malic, phosphoric, and lactic acids have been found to yield acceptable results. Lactic acid and malic acid are particularly preferred acid because it is has mild taste and aroma that are more naturally associated with coffee products.

While not wishing to be limited by theory, it is believed that the addition of natural acids to achieve a pH of about 4.6 to 5.2 or does not impart a tart taste to final coffee beverage due to using a very small serving of the ultra-concentrated liquid coffee. The amount of acid added to achieve shelf stability has minimal-adverse impact on taste, flavor or aroma. Never the less, the added acid may accentuate the fine taste of coffee.

The current discovery is contradictory to prior art. Typically, for liquid coffee beverages, a pH from about 4.7 to about 5.3 and, more preferably, a pH of about 4.9 to about 5.1 are desired. Therefore, the methods herein described, of adding the supplemental coffee acid source component to arrive at a pH 4.6 or less are an unexpected approach for coffee preservation.

The amount of added supplemental coffee acid source component may vary depending on the starting pH of coffee. A range of 0.1-3.0% of one or more supplemental coffee acid source component maybe added. Preferably, about 0.5-1.5% of one or more supplemental coffee acid source component maybe added at any time of the manufacturing process.

Furthermore, it had been discovered that coffee source component may be selected to achieve a pH of about 4.6 or less and thus reduce or eliminate the need for supplemental coffee acid source component. Coffee sources have been found to contain varying levels of acids depending on their form. For example, green coffee has been found to contain approximately 11% total acid by weight, roasted coffee has been found to contain approximately 6% total acid content by weight, and instant coffee has been found to contain approximately 16% total acid content by weight. Coffee sources with varying acidity and pH may be employed in the current invention as acidifying agents to achieve a pH of about 4.6 or less.

The present inventors have surprisingly discovered that coffee oil has the capability of masking any sour taste or tartness in the ultra-concentrated coffee. Particularly, the present invention concerns the addition of coffee oil to soluble coffee in such a way as to suppress the "instant" flavor and aroma of soluble coffee, coffee extracts and coffee concentrates, such that the instant flavor is less easily or less readily perceived by the consumer. In addition, the present inventors have surprisingly and unexpectedly discovered that this addition of coffee oil to concentrated coffee also suppresses the undesirable aroma typically associated soluble coffee, coffee extracts and coffee concentrates, thereby improving the consumer perception in a second way.

Without intending to be limited by theory, it is believed that volatile flavor and aroma components typically produced during the processing of soluble coffee, coffee extracts and coffee concentrates products preferentially diffuse into the fine coffee oil droplets created during the homogenization process of the present invention. With these volatile components essentially trapped within the oil droplets, the concentration of the volatile components is distributed in the liquid beverage, which in turn suppresses the perception of the undesirable flavor and aroma. Thus, by suppressing the undesirable acid notes, flavor and aroma, the present inventors have discovered a method to improve the flavor and aroma of ready to brew or dilute coffee concentrate.

Additionally, it is believed that the coffee oil may enhance the positive perceived flavor and aroma of the soluble coffee either by providing additional positive flavors and aroma to the soluble coffee, or by simply allowing positive flavors and aromas already present in the coffee to be perceived, since the negative flavors and aromas are suppressed.

As such, in one embodiment, the present invention describes a process to enhance flavor and aroma of acidified coffee concentrates wherein the coffee oil has a droplet size of from about 0.1 micron to about 25.0 micron when reconstituted as a coffee beverage. In another embodiment, the present invention provides a method of producing an ultra-concentrated coffee product having improved flavor and aroma by utilizing a coffee oil source comprises *Coffea Arabica* var. *Arabica* wherein the coffee oil has a droplet size of from about 0.1 micron to about 15.0 micron when reconstituted as a coffee beverage and wherein the coffee product is free of added surfactants and stabilizers.

According to the current invention, when coffee oil is added to liquid coffee concentrate and homogenized, the coffee oil, and accordingly aroma, becomes evenly distributed in the ultra-concentrated liquid coffee. This serves to eliminate oil separation in a liquid medium as well as in the final hot coffee beverage. Additionally, coffee oil may be spray dried on a carrier (like maltodextrin) and added to liquid coffee concentrates.

The oil can be added to coffee source component using either a batch or continuous process system. Coffee oil, at about 1% to about 20%, preferably about 1% to about 15%, by weight of solids of the coffee source component, calculated as described above, is added to the coffee source component in an agitated tank in order to disperse the oil, thereby creating a pre-emulsion. Once added, the dispersed oil is then pumped to a two-stage homogenizer, such as the Gaulin M3 (APV-Gaulin Co., Everett, Mass.) equipped with a standard valve and homogenized at about 5000 psig with the second stage comprising about 10% of the total pressure. The resulting homogenized liquid coffee concentrate extract is ready for optional further processing.

The temperature of the emulsion ranges from about ambient to about 130 degrees F., preferably between about 70-100 degrees F. In general, the temperature of the emulsion of coffee oil and the coffee source component should be controlled precisely to ensure that volatile flavor and aroma component will be retained and no heat induced off-notes are developed.

Furthermore, the concentrated coffee product of the present invention is free of added surfactants and stabilizers, which are commonly used to maintain such oil-in-water emulsions and may produce bitterness in coffee concentrates. Surprisingly, the present inventors found that, because of the size of the oil droplets formed during the homogenization process disclosed herein, the present ultra-concentrated liquid coffee remains homogenized both while packaged and upon reconstitution. This surprising discovery results in an ultra-concentrated liquid coffee which has an improved flavor and aroma when compared to other coffee concentrates.

Moreover, the present improved ultra-concentrated liquid coffee comprises from about 0.5% to about 3%, preferably from about 0.5% to about 1%, and more preferably from about 0.75% to about 1%, coffee oil, by weight of the final soluble coffee product.

Additionally, the coffee oil has a droplet size of from about 0.1 micron to about 25 micron, preferably from about 0.1 micron to about 20 micron, more preferably from about 0.1 micron to about 15 micron, and still more preferably from about 1 micron to about 10 micron when the soluble coffee product is reconstituted as a coffee beverage. It is preferred that the oil droplet size distribution within these ranges is mono-modal following an approximate normal or Gaussian curve, meaning a symmetrical or bell shaped distribution curve. The coffee oil droplet size of the present invention may be measured with a Horiba LA-910 Particle Size Distribution Analyzer (Horiba Instruments, Inc., Irvine, Calif.).

Coffee oil maybe spray dried on a carrier (like maltodextrin) and added to the liquid coffee concentrates at about 0.1 to about 5% at ambient temperature.

The ultra-concentrated shelf-stable liquid coffee is then filled into suitable containers, with or without thermal treatment like retort or heating prior to filling. Containers suitable for containing the ultra-concentrated shelf-stable liquid coffee of the invention can be flexible, semi-rigid or rigid depending upon the process conditions and the type of product desired. Suitable containers include, but are not limited to, stick packs; sachets; carton-based; tetrahedron packs (closeable or not); Unifill packs; squeezable plastic bottles; stand up pouches; multi-serve bottles, portable bottles, plastic cups; and the like. The containers should be such that they provide a bather to minimize exposure of the whitened coffee concentrate to water vapor, oxygen, and light transmission. A sufficiently high barrier can be obtained, for example, with a container made of a film that contains polyester/aluminum/polyethylene layers.

In one embodiment the ultra-concentrated shelf-stable liquid coffee is packaged in single serving containers. For single serving containers, the container is suitably a sachet or stick pack. By stick pack is meant a long, narrow sachet. Equipment and material for producing these containers are commercially available. Vertical form fill and seal machines may be used. Conveniently, the sachet or stick pack has a tear off section which may be provided in the usual manner by a notch, fancy cut, or laser cut. Presenting the ultra-concentrated shelf-stable liquid coffee in this form offers the advantage that the coffee concentrate may be provided in a convenient, single serving pack. The consumer then need only open the pack, pour or squeeze the concentrate into a cup, and add water. Typically, the stick pack contains between about 5 g and 7 g of the concentrate.

In another embodiment the ultra-concentrated shelf-stable liquid coffee is packaged in plastic containers and sealed with foil lid. Standard and commercially available polystyrene cups with various barriers and liners may be filled with the ultra-concentrated shelf-stable liquid coffee is packaged as single serving containers to used with commercial coffee serving machines. One widely used single serve coffee machine is Keurig Single Serve brewing system coffee machine. The plastic container holds about 29-31 grams of a food product. In such a case, it will be a challenge to fill only 5-7 grams of concentrated shelf-stable liquid coffee. In order to overcome the difference in fill volume as a result of using the inventive concentrated shelf-stable liquid coffee, the liquid coffee will have to be thickened up to prevent leaking out of plastic cup when placed into a coffee machine. It is also recommended to purge inert gas into the plastic cup to preserve the integrity of flavor and aroma of concentrated shelf-stable liquid coffee inside the cup.

Yet in the utilization of plastic cups embodiment of the ultra-concentrated shelf-stable liquid coffee is to incorporate a stabilizing gum. Gums are typically used to suspend insoluble solids as well as to add a sense of substance to the mouth feel of the final product. In this embodiment, gum is used to increase viscosity of ultra-concentrated shelf-stable liquid coffee up to prevent leaking out of plastic cup when placed into a coffee machine. Any food grade gum may be used. Preferred stabilizing gums include carageenan, Xanthan, Guar, Arabic and Pectin. The most preferred stabilizing gum is xanthan. Based on weight, the stabilizing gum preferably comprises about 0.025 to about 0.3% of the liquid beverage concentrate, more preferably from about 0.15 to about 0.25%, and most preferably about 0.10%.

Beverages produced from the ultra-concentrated shelf-stable liquid coffee have a good aroma and flavor profile without harsh acidity. In addition, the ultra-concentrated shelf-stable liquid coffee of the invention has good stability and may be stored for extended periods at room temperature.

Turning to more of the details, the starting coffee source component may be formed as an extract of roast and ground coffee, concentrated coffee liquids, reconstituted coffee, soluble coffee or an instant coffee, microground coffee with or without water. By one approach, a suitable coffee source component may have between about 20 and about 60 percent solids and, preferably, about 30 and about 55 percent solids, and most preferably, between about 40 percent and 60 percent solids. Coffee source component may be obtained from blending various coffee components at room temperatures to yield about 70 percent coffee extracts. Preferred starting liquid concentrates and extracts generally have an initial pH ranging from about 4.7 to about 5.2. Soluble coffee may have various acidity levels that will have to be taken into account when making coffee source component.

The desired organoleptic qualities of taste, flavor, and acidity should remain relatively consistent by adjusting percentage of various coffee source components to produce light, medium or dark roast flavor profile. Next, about 0.5 to about 1.5 percent supplemental coffee acid source component is added. Optional flavor supplements may be added. About 1.0 percent of volatile coffee flavor additive is optionally added to the adjusted coffee concentrate. If desired, the coffee flavor may also be added prior to addition of supplemental coffee acid source component. By one approach, the volatile coffee flavor may be a natural or artificial coffee flavor.

Coffee source component, supplemental coffee acid source component and other optional flavors may be combined in a standard food mixing and processing vessel in any order of addition. No heating is required for blending. The most important factor to be observed is to bring the pH of the mix to about 4.6 or below. A range of pH of 3.8 and 5.2 would be suitable, preferably about pH 4.45 to 4.95.

Coffee oil is then added to Coffee source component, supplemental coffee acid source component and other optional flavors. After mixing, coffee oil, at about 1% to about 20%, preferably about 0.1% to about 10%, by weight of solids of the coffee source component is added to the coffee source component, supplemental coffee acid source component and other optional flavors in an agitated tank in order to disperse the oil, thereby creating a pre-emulsion. Once added, the dispersed oil is then pumped to a two-stage homogenizer, such as the Gaulin M3 (APV-Gaulin Co., Everett, Mass.) equipped with a standard valve and homogenized at about 5000 psig with the second stage comprising about 10% of the total pressure. The resulting homogenized liquid coffee concentrate extract is ready for optional further filling. It is important to keep the temperature at lower than pasteurization temperatures and preferably between 90 and 120 F.

In another embodiment, finely ground coffee, microground coffee, pulverized coffee and/or micronized coffee may be used as a part of the coffee source components at about 0.1 to 10% of the weight of finished coffee liquid concentrate. Ground coffee may be selected from a variety of roasted beans to achieve various roasted coffee flavors. Ground coffee may be produced using a conventional grinding equipment or commercial size micro-reduction apparatus to achieve particle size of about 20 to about 350 micron and preferably less than about 100 micron. Finely ground coffee should be added to the liquid concentrate at a temperature about 110 degree F. or less. If ground coffee is added at a high temperature of about 130 F or above, extraction of flavor and aroma starts in the liquid concentrate rather than in the finished coffee composition intended for consumption. It is imperative to prevent swelling of the ground coffee which may result from water present in the concentrate. This swelling can cause the release of color, flavor and aroma prior to adding hot or cold water prior to consumption. It was surprisingly discovered that if ground coffee is preserved in the un-extracted status and allowed to extract only with hot water prior to final utilization, the fresh taste and aroma of coffee are released in the finished liquid beverage imparting high quality characteristics to the consumed coffee. Even at ambient temperature, the amount of solids present in the coffee concentrate and the corresponding water activity may impact the extraction rate of microground coffee. It was discovered that total solids of about 30 to 70% and water activity of about 0.985 to 0.845 are suitable to reduce color, flavor, taste and aroma extraction from the finely ground coffee. It is crucial that the dry microground coffee components have the same physical characteristics in terms of taste, aroma and color before and after the addition to liquid coffee source components.

Microground (pulverized, micronized, size reduced or finely ground) coffee may be incorporated as dry particles or added to any liquid at temperature below about 130 F and consequently added to liquid concentrated coffee solution.

The ultra-concentrated shelf-stable liquid coffee is then filled into suitable containers, without thermal treatment like retort or heating prior to filling. Containers suitable for containing the ultra-concentrated shelf-stable liquid coffee of the invention can be flexible, semi-rigid. Suitable containers include, but are not limited to, stick packs; sachets; carton-based; tetrahedron packs (closeable or not); Unifill packs; squeezable plastic bottles; stand up pouches; multi-serve bottles, portable bottles, plastic cups; and the like.

Beverages produced from the ultra-concentrated shelf-stable liquid coffee have a good aroma and flavor profile without harsh acidity. In addition, the ultra-concentrated shelf-stable liquid coffee of the invention has good stability and may be stored for extended periods at room temperature.

Advantages and embodiments of the methods described herein are further illustrated by the following examples; however, the particular conditions, processing schemes, materials, and amounts thereof recited in these examples, as well as other conditions and details, should not be construed to unduly limit this method. All percentages are by weight unless otherwise indicated.

EXAMPLES

Example 1

Instant shelf-stable liquid coffee concentrates were formed as follows: one thousand gram batches of the components mentioned below were blended in a Hobart mixer at corresponding weight to make various combinations. After blending, combinations were transferred to double wall heating stainless steel containers, heated to about 160-180° F. with agitation until all components were thoroughly mixed. Various combinations were homogenized in a two-stage homogenizer, such as the Gaulin M3 (APV-Gaulin Co., Everett, Mass.) equipped with a standard valve and homogenized at about 4000 psig wherein the second stage comprises about 10% of the total pressure. Supplemental acid components (comprised about 50% dry acids as blends of lactic, malic, and citric acids at equal ratios) in water by weight) were added to homogenized mixtures. The resulting liquid coffee concentrates extract were ready for optional further packaging.

The products were formulated as follows:

| Ingredient | 1 % | 2 % | 3 % | 4 % | 5 % |
|---|---|---|---|---|---|
| Liquid Coffee Concentrates | 78.00 | 48.50 | 64.30 | 7.70 | 0.00 |
| Liquid Coffee Extracts | 10.00 | 30.00 | 0.00 | 50.00 | 0.00 |
| Soluble Coffee | 10.00 | 20.00 | 35.00 | 42.00 | 60.00 |
| Water | 0.00 | 0.00 | 0.00 | 0.00 | 39.90 |
| Supplemental Acid Blend | 1.00 | 0.50 | 0.10 | 0.00 | 0.00 |
| Coffee Oil | 1.00 | 0.50 | 0.30 | 0.10 | 0.10 |
| Coffee Aroma | 0.00 | 0.50 | 0.30 | 0.20 | 0.00 |
| Total Coffee Solids | 31.12 | 38.84 | 50.43 | 55.85 | 60.00 |
| pH | 4.25 | 4.53 | 4.95 | 5.16 | 5.21 |

Resultant instant shelf-stable liquid coffee concentrates were packaged in laminated foil pouches (about 5.0 grams each) and sealed. The content was added to an empty cup and about 8 ounces (about 240 ml) of hot water was poured into the cup. Sensory evaluation of the hot beverages was conducted including flavor, taste, aftertaste and aroma. The organoleptic characteristics of the hot beverages were excellent with typical coffee aroma and flavor and without sourness, harshness or astringency. It appeared that mixing various coffee source components with different acidity levels may help achieve a suitable pH range to produce shelf stable concentrates. Coffee oil helped mask sour notes especially at lower pH ranges.

Example 2

The impact of total solids concentration and water activity levels on the extraction rate of coffee flavor, aroma and taste from added microground coffee in the concentrated liquids was researched. Total solids was calculated as amount of Maltodextrin M100 plus 5% microground coffee (particle size of about 200 micron or less) added to water as a weight percentage. Maltodextrin M100 was selected due to its ability not impart turbidity to liquids at higher concentrations. Water and Maltodextrin M100 were blended, heated to about 170 F, cooled to ambient temperature then microground coffee was added and mixed thoroughly. Formulations were filled into clear glass jars and stored at ambient temperature for 10 days. Water activity (Aw) and pH were measured immediately after the addition of microground coffee and after 10 days of storage.

| Formulation | Total Solids % | Moisture % | Aw | pH |
|---|---|---|---|---|
| A | 20 | 75 | 0.986@23° C. | 5.21 |
| B | 25 | 70 | 0.987@23.3° C. | 5.23 |
| C | 30 | 65 | 0.981@23.4° C. | 5.2 |
| D | 35 | 60 | 0.983@23.6° C. | 5.19 |
| E | 40 | 55 | 0.975@23.2° C. | 5.21 |
| F | 45 | 50 | 0.974@23.5° C. | 5.2 |
| G | 50 | 45 | 0.964@23.3° C. | 5.14 |
| H | 55 | 40 | 0.957@23.7° C. | 5.4 |
| I | 60 | 35 | 0.937@23.6° C. | 5.16 |

Comparison between fresh and stored formulations were made by comparing change in water activity and pH measurements, by observing degree of change in color of the solution and by tasting the solutions to determine how much coffee aroma, flavor and taste was extracted into the solution during storage.

| Formulation | Aw | pH | Color change % | Taste change % |
|---|---|---|---|---|
| A | 0.982@21.6° C. | 5.11 | 25 | 15 |
| B | 0.979@21.6° C. | 5.1 | 20 | 15 |
| C | 0.976@21.8° C. | 5.07 | 15 | 15 |
| D | 0.974@21.9° C. | 5.08 | 15 | 10 |
| E | 0.967@21.9° C. | 5.09 | 10 | 10 |
| F | 0.962@22° C. | 5.05 | 10 | 5 |
| G | 0.953@22.5° C. | 5.04 | 5 | 0 |
| H | 0.942@23.1° C. | 5.05 | 5 | 0 |
| I | 0.917@23.7° C. | 5.05 | 0 | 0 |

Minor decrease in both water activity and pH indicated that very little extraction of ground coffee has taken place during the storage period. If ground coffee has absorbed a lot of water and swollen, more decrease in water activity would have been notice. Furthermore, if ground coffee components were extracted out of the particles, more acids would have been released into the solution causing sharper drop in pH.

About 240 grams of cold water was added to about 5 grams of various formulations to observe if microground coffee has already released coffee taste and aroma into solutions during storage. Adding cold water did not exhibit that organolypticaly noticeable coffee taste or aroma was released during storage. However, upon the addition of about 240 grams of hot water to about 5 grams of various combinations, coffee aroma and taste was released and with the results indicating that microground coffee components were preserved inside the microground coffee particles until the final hot beverage was made. The higher the total solids and the lower the water activity of solution, the less color and coffee taste (and aroma) was lost or released. Thus, it appeared that dry microground coffee components maintained the same physical characteristics before and after the addition to liquid coffee source components.

These surprising findings indicates that when microground coffee is added to a concentrated liquid coffee solution without further thermo processing, the good attributes of coffee (aroma, taste, flavor and color) are preserved until the concentrate is ready to be consumed by the consumer. This clearly demonstrates that the product of the invention provides a high level of desirable shelf stability.

Example 3

To evaluate the impact of ground coffee on masking the sour notes or instant coffee notes in concentrated liquid coffee, microground coffee (particle size of about 300 micron or less) was added to various liquid coffee blends. Liquid coffee blends 6, 7, 8, 9 and 10 were prepared as follows: one thousand gram batches of the components mentioned below (except for microground coffee) were blended in a Hobart mixer at corresponding weight to make various combinations. After blending, combinations were transferred to double wall heating stainless steel containers, heated to about 160-180° F. with agitation until all components were thoroughly mixed. After cooling to about 90 F, microground coffee (particle size of about 300 micron or less) was added to various liquid coffee concentrates.

| Ingredient | 6 % | 7 % | 8 % | 9 % | 10 % |
|---|---|---|---|---|---|
| Liquid Coffee Concentrates | 69.50 | 44.50 | 64.40 | 0.00 | 0.00 |
| Liquid Coffee Extracts | 10.00 | 30.00 | 0.00 | 60.00 | 0.00 |
| Soluble Coffee | 10.00 | 21.00 | 20.00 | 35.00 | 64.00 |

-continued

| Ingredient | 6 % | 7 % | 8 % | 9 % | 10 % |
|---|---|---|---|---|---|
| Microground Coffee | 10.00 | 1.0 | 15.00 | 5.00 | 6.00 |
| Water | 0.00 | 0.00 | 0.00 | 0.00 | 30.00 |
| Acid Blend | 0.50 | 0.50 | 0.60 | 0.00 | 0.00 |
| Total Coffee Solids | 39.08 | 45.88 | 50.46 | 54.40 | 70.00 |
| pH | 4.55 | 4.73 | 5.03 | 5.10 | 5.15 |

Instant shelf-stable liquid coffee concentrates were packaged in plastic cups at about 3.5 grams each, and sealed with foil lids. Furthermore, the same combinations were filled into multi-serve bottles with one way valve-containing caps to allow for squeeze dispensing into serving cups. Concentrates were evaluated in hot water. The organoleptic characteristics of the hot beverages were excellent, with typical coffee aroma and flavor and without sourness, harshness or astringency. Microground coffee inclusion imparted freshness and quality to the prepared hot coffee. Microground coffee preservation until activated by the addition of hot water provided a novel method to deliver quality coffee components in a concentrated format. It was noticed that microground coffee was evenly suspended throughout the concentrate and did not precipitate to the bottom of containers. It appeared that having total coffee solids at about 40 to 70% helped in suspending microground coffee particles throughout the liquid until final utilization.

Example 4

The ability of the instant shelf-stable liquid coffee concentrates to inhibit the proliferation of various bacteria was studied. The liquid coffee concentrates 2 and 3 of example 1 were submitted for a challenge test. The products were challenged against the bacteria E. coli 0157:H7 (chosen because it represents a serious health concerns in the fields of food industry and medical care organizations). The goal of was to determine if the product was able to reduce the level of the organism by a log factor of five within three days. A culture of E. coli 0157:H7 (ATCC#700728) was grown and inoculated into 100 grams of the test product. Samples were left at room temperature (approximately 72 F), and tested once a day for four days, using Plate Count Agar. The initial inoculation level was 61,000,000 cfu/g. sample (6.1×10^7). The goal of the test was to determine how the organism would react to the product. The limit for passing this test was set at a reduction of at least five logs from the inoculation level within 3 days of the inoculation. The results were as follows:
Initial Count:
Aerobic Plate Count<10 cfu/g
Day 1:
Aerobic Plate Count<10 cfu/g
Day 4:
Aerobic Plate Count<10 cfu/g Initial testing demonstrated no presence of significant initial amounts of coliform, or E. coli prior to inoculation which might interfere with the test. One-day results indicated that the concentrates were able to reduce the level of the inoculated organism to below the lower limits of the test, <10 cfu/gm. Each follow up test at days 2-4 yielded the same result of <10 cfu/gm. The results from the tests show a reduction greater than six logs. The products passed the tests and indicated that other pathogenic and spoilage microorganisms will be expected to be inhibited and it would also be expected to show concentration count reduction in the manner observed with the tested E. coli.

Example 5

The ability of the instant shelf-stable liquid coffee concentrates to inhibit the proliferation of various mold and yeasts was studied. The liquid coffee concentrates 2 and 3 of example 1 were submitted for challenge tests. The test samples were inoculated with approximately 100,000 per gram of sample with Aspergillus niger or Hanseniaspora uvarum. The goal of the tests was to determine how each organism would react to the product. Passing, or failing this stress test was determined by the growth, or death rate of the organisms, along with the organisms' ability to maintain viability (survive) in the product. Initial test of the samples to be used showed no significant presence of any of the test organisms. Seven-day results indicated that the sample was able to inhibit the growth of all of the inoculated organisms. It significantly decreased the inoculated levels of each of the organisms. Results for subsequent testing remained at or about <10. While there was a count in the thousands for both the Lactobacillus buchneri and Hanseniaspora uvarum organisms at 7 days, these counts still represented over a 95% reduction from the inoculation level 7 days earlier. Additionally the organism was completely eliminated by day 21. These concentrates passed the stress tests. These results, also demonstrate that the coffee concentrates of the present invention have the ability to inhibit growth of these organisms. Furthermore, the tests demonstrate that the coffee concentrates will quickly and effectively decrease significant amounts of these organisms if they find their way into the products during production or after they have been opened.

What is claimed is:

1. A shelf stable liquid coffee concentrate comprising:
 a—coffee source components;
 b—a coffee oil component which is present in an amount of about 0.5% to about 3% of the total concentrate;
 c—a supplemental coffee acid source component; and
 d—wherein the concentrate has a pH of about 4.6 to 5.2.

2. The composition of claim 1 wherein the coffee source components are comprised of coffee solids which are present in an amount of about 40% to about 70% of the total concentrate.

3. The composition of claim 1 wherein the coffee oil component has a droplet size of from about 0.1 micron to about 25 micron.

4. The composition of claim 1 wherein the supplemental coffee acid source component is present in an amount of about 0.1 to about 1.5 percent of the total concentrate.

5. The composition of claim 1 wherein the supplemental coffee acid source component is present in an amount to adjust the pH to a range of about 4.6 to 5.2.

6. The composition of claim 1 wherein the coffee source component is present in the form of ground coffee.

7. The composition of claim 6 wherein the coffee source component is present in the form of a microground coffee.

8. The composition of claim 7 wherein the microground coffee is present in an amount of about 1-15% of the total concentrate.

* * * * *